Patented Oct. 4, 1938

2,132,091

UNITED STATES PATENT OFFICE 2,132,091

METHOD OF PRODUCING YEAST MASH

Casey J. Wilken, Sunset Hills, Va.

No Drawing. Application April 15, 1937,
Serial No. 137,117

5 Claims. (Cl. 99—51)

The present invention relates to the production of a mash for whisky manufacture, whereby the constituents of the grain will be more completely utilized, a higher grade of whisky will be produced from the same initial grain, the manufacture will be hastened, and a distilled whisky produced which will age more rapidly, as compared with the processes heretofore employed.

A long used method for the manufacture of whisky consists in first producing a yeast mash from a small amount of the grain including malt, in the form of a meal, with water, adding a culture of distillers' yeast thereto and allowing growth of the yeast, then adding this to a large quantity of the desired grain mashed with water and converted with malt, allowing fermentation to go on to develop alcohol, distilling the fermented mash and aging the distillate in charred oak casks. The present improvement relates to a specific improvement in such a procedure.

I give the following specific example, it being understood that the invention is not restricted to the specific details.

A yeast mash is made, using a mixture of equal parts of rye meal and barley malt meal (such a mixture weighing 56 pounds per bushel) with twelve to fifteen gallons of water for each bushel of the meal. Then a lactic acid "seed" or culture of lactic acid bacillus, is added, and the mash is allowed to stand at 122° F. to 128° F., for 24 to 48 hours. During this period some lactic acid is developed in the said mash. At the end of this stage the said mash is heated to about 156° F., in order to pasteurize it. This pasteurization destroys wild yeasts, bacteria and most of the other living organisms that are likely to be present, except the rod-shaped lactic acid bacilli, and these are (by this heating) rendered substantially inactive, for a time. The mash is then cooled down to 65–70° F. (No novelty is claimed on the above series of steps.) Then 1% by volume, (based on the amount of the yeast mash) of unpasteurized sweet milk is then added, the mixture stirred and allowed to stand for 1 to 6 hours, during which time the microorganisms of the milk become active, and it is my belief that they prepare some additional food probably creating a greater amount of enzymes or in some manner supplying either better or additional food for the yeast to live upon. Yeast mash prepared in this manner certainly has a greater amount of activity of the yeast in the first 36 hours of its work upon the corn or rye mash in the fermenters. Whatever additional lactic acid that may be supplied by the presence of the milk seems not to allow liberation of hydrogen or other harmful gases. During the said period of 1 to 6 hours, and particularly after about the second hour, it will be observed that the rod-shaped lactic acid bacteria have become larger in cross section (i. e. "fatter" in appearance, or will acquire a "bloated" appearance). This is perhaps due to the fact that the microorganisms of the milk have rendered available as food for the lactic acid bacteria (and also for the yeast) a much greater portion of the proteinous constituents of the grains in the yeast mash. At this stage the amount of lactic acid in the mash may be such that 100 c. c. of the mash will require about 7 c. c. of normal NaOH solution for neutralization. This figure is subject to variation. A culture of the distillers' yeast is then added, and the mixture well stirred. The amount of the yeast culture may vary between wide limits, depending on the strength of the yeast culture. At the time of adding the yeast culture, the yeast mash should have a gravity of about 22° to 26° Balling, and after the culture has been added, the yeast should be allowed to develop until the gravity of the mash has fallen to about 9° or 10° Balling. The yeast mash is then added to the main mash in the fermenter. The main mash in the fermenter can be made from one kind of grain or several kinds of grains (preferably ground to the state of meal) cooked in water, with malt added. The amount of grain in the fermentation mash may be for example about twenty-five times the amount of the grain in the yeast mash, but larger or smaller amounts can be used. The main fermentation is then allowed to proceed, say at atmospheric temperature (but never above 92° F.), in the usual manner, for a time not over 72 hours to 96 hours. The distillation and barrelling of the distillate can be carried out in the usual manner.

Instead of whole milk, as referred to in the above example, I can employ skim milk, because the butter fat content of the milk apparently does not exercise any particular function in the process, but at the same time it does no harm. The milk should be fresh, when added to the yeast mash, and free or substantially free from lactic acid. The milk so used should be unpasteurized. If desired, egg or egg yolk or egg white can be added to the milk, say two eggs well beaten, to each gallon of milk. The proteins of the eggs and the proteins of the milk and the proteins of the meal above referred to, or the reaction products of these, furnish nutrient for the growth and development of the yeast. The addition of the egg material is useful when the yeast is undernourished.

It is my belief that the micro-organisms of the milk, i. e. the microzamas, assist materially in converting the proteins of the grain into a form assimilable by the yeast organisms, e. g. into amides, amino acids, etc.

I believe the improved result may be due in large part to the fact that the milk, in conjunction with the lactic acid formed, exercises three particular functions:

(1) Additional protection against wild yeasts and bacteria, by the lactic acid produced;

(2) Production of a greater amount of food for the yeast nutrition, by action of the micro-organisms (microzamas) of the milk on the proteids of the grain, and (3) The mineral salts of the milk also afford additional food for the yeast.

The proteins of the grains of course ordinarily furnish food or nutritional elements for the yeast. In the present process the micro-organisms (microzamas) of the milk convert a larger proportion of the proteins of the grain into amides, which are directly utilized by the yeast cells for growth and development of the same. The addition of eggs to the milk seems also to furnish additional quantities of readily assimilable proteins (albumens) and other nutritional substances for the yeast. The function of the milk organisms of forming lactic acid in the mash, is of course one of the functions. A more important function is the increased conversion of the proteinous constituents of the grain or grains, into forms suitable as yeast nutrient, whereby the action of the yeast itself on the carbohydrates (to form alcohol) is greatly speeded up. This is the most important function, and it is due to this that the completion of the fermentation is accelerated. The more efficient the fermentation, the better the product.

The increase in the efficiency of the yeast, gives better fermentation, hence better distillate, hence better whisky in a shorter time of aging.

The pure yeast culture is what is known as distillers' yeast. The cells are egg shaped, and they reproduce and multiply by budding at the smaller end of the cell. The function of the distillers' yeast is to produce alcohol by fermentation from sugars present such as dextrose, glucose, maltose, and also from dextrine and indirectly from the starches.

On account of the highly active condition of the yeast cells, brought about by the milk and the above stated results of milk addition, the conversion of the sugars and other carbohydrates in the grain into alcohol is much accelerated, producing a shortening of the time of fermentation. Due to the enhanced activity and strength of the yeast cells, the conversion of the carbohydrates into alcohol is made more complete than by the usual fermentation processes, thereby giving a slight increase in the amount of alcoholic beverage produced from the grains used.

In the present case, there is also produced, during the fermentation, and there is recovered in the distillate, substantial quantities of esters, which improve the bouquet of the distillate, and this process also accelerates the aging of the distillate in the charred oak casks. This may be because by the rapid fermentation, less solids and objectionable acids are produced, thereby giving a cleaner high wine.

It will be understood that the 4% or so of the total grain which goes into the yeast mash is preferably composed of equal parts of rye meal and barley malt meal. The remaining 96% of the grain used can be composed of various grains or mixtures of grains, i. e. mostly corn for making bourbon whisky and mostly rye for making rye whisky, etc., together with other grains and malt (e. g. barley malt, rye malt, etc.).

The term "meal" as used herein is intended to cover crushed, ground or comminuted grains irrespective of the degree of fineness.

I claim:—

1. In the making of a mash for whisky distillation by the herein described method which comprises forming a yeast mash from rye meal and barley malt meal and water, allowing this to stand at about 122° F. to about 128° F., for about 24 to about 48 hours to develop lactic acid therein, pasteurizing the yeast mash and thereafter fermenting by distillers' yeast, the improvement which comprises adding a small percentage of fresh unpasteurized milk to the pasteurized yeast mash, and allowing to stand for about 1 hour to about 6 hours, prior to the step of adding a culture of distillers' yeast to the yeast mash.

2. In making a yeast mash for whisky manufacture, the step of adding a small percentage of unpasteurized milk to a pasteurized rye meal and malt meal mash in which some lactic acid has already developed, and allowing to stand for about 1 to 6 hours.

3. In making whisky, forming a yeast mash by adding milk to a meal pasteurized mash already containing lactic acid, and allowing to stand for about 1 hour to about 6 hours before the addition of the yeast culture to the yeast mash, and allowing growth of yeast, mixing with several volumes of grain mash, fermenting and distilling.

4. In making a yeast mash for whisky manufacture, mashing rye meal and barley malt meal with water, allowing development of lactic acid in said mash, pasteurizing said mash, adding about 1% of unpasteurized milk thereto, adding a culture of distillers' yeast, and permitting growth and development of yeast in the yeast mash.

5. In making a yeast mash for use in the manufacture of whisky, the herein described step of adding a small percentage of unpasteurized milk to a cool pasteurized yeast mash already containing lactic acid.

CASEY J. WILKEN.